US012592509B2

(12) United States Patent
Gazke et al.

(10) Patent No.: US 12,592,509 B2
(45) Date of Patent: Mar. 31, 2026

(54) ELECTRICAL CONNECTION UNIT HAVING SPRING-LOADED PRESS-ON CONTACTS

(71) Applicant: KOSTAL Kontakt Systeme GmbH, Luedenscheid (DE)

(72) Inventors: Dennis Gazke, Breckerfeld (DE); Holger Botzen, Luedenscheid (DE); Andreas Scheib, Schwerte (DE); Sebastian Vogt, Luedenscheid (DE)

(73) Assignee: KOSTAL Kontakt Systeme Gmbh & Co. KG, Luedenscheid (DE)

( * ) Notice: Subject to any disclaimer, the term of this patent is extended or adjusted under 35 U.S.C. 154(b) by 344 days.

(21) Appl. No.: 18/453,602

(22) Filed: Aug. 22, 2023

(65) Prior Publication Data

US 2023/0396011 A1 Dec. 7, 2023

Related U.S. Application Data

(63) Continuation of application No. PCT/EP2022/058996, filed on Apr. 5, 2022.

(30) Foreign Application Priority Data

Apr. 17, 2021 (DE) ..................... 10 2021 002 030.8

(51) Int. Cl.
*H01R 13/24* (2006.01)
*H01R 13/08* (2006.01)
(Continued)

(52) U.S. Cl.
CPC ......... *H01R 13/2421* (2013.01); *H01R 13/08* (2013.01); *H01R 13/115* (2013.01); *H01R 13/2428* (2013.01); *H01R 13/506* (2013.01)

(58) Field of Classification Search
None
See application file for complete search history.

(56) References Cited

U.S. PATENT DOCUMENTS

| | | | | |
|---|---|---|---|---|
| 6,932,620 | B2 | 8/2005 | Ishiguro et al. | |
| 7,029,286 | B2 * | 4/2006 | Hall ..................... | H01R 13/506 439/63 |

(Continued)

FOREIGN PATENT DOCUMENTS

| | | | |
|---|---|---|---|
| DE | 19527425 | C1 | 1/1997 |
| DE | 102006052118 | A1 | 5/2008 |

(Continued)

OTHER PUBLICATIONS

The International Bureau of WIPO, International Preliminary Report on Patentability for International Application No. PCT/EP2022/058996 issued Oct. 12, 2023.

(Continued)

*Primary Examiner* — Oscar C Jimenez
(74) *Attorney, Agent, or Firm* — Brooks Kushman P.C.

(57) ABSTRACT

A connection unit includes an insulating mounting frame and multiple resilient press-on contacts situated on the mounting frame. Each press-on contact includes a helical pressure spring that can exert an elastic force on a metal contact body. The contact body is connected in one piece to a connection plug or a connection socket. For each press-on contact, the mounting frame includes a hollow cylinder that forms a cavity within a circumferential wall, the cavity being closed off by a cover that is situated so as to be axially displaceable at the wall of the hollow cylinder. The pressure spring is situated inside the cavity, and with its elastic force acts on the cover. The contact body, in one piece, forms a contact disk that is situated on the outer side of the cover.

17 Claims, 5 Drawing Sheets

(51) Int. Cl.
*H01R 13/115* (2006.01)
*H01R 13/506* (2006.01)

(56) References Cited

U.S. PATENT DOCUMENTS

| | | | | |
|---|---|---|---|---|
| 7,607,929 | B1 * | 10/2009 | Nguyen | H01R 24/52 439/246 |
| 8,021,189 | B2 * | 9/2011 | Zayas | H01R 33/965 439/617 |
| 10,804,635 | B2 * | 10/2020 | Song | H01R 13/2407 |
| 2011/0254575 | A1 | 10/2011 | Uesaka et al. | |
| 2020/0244018 | A1 * | 7/2020 | Park | H01R 13/2421 |
| 2024/0339935 | A1 * | 10/2024 | Fan | H02M 7/003 |

FOREIGN PATENT DOCUMENTS

| | | | |
|---|---|---|---|
| DE | 102008007744 | B3 | 10/2009 |
| DE | 102012016281 | A1 | 5/2014 |
| EP | 1102365 | A2 | 5/2001 |
| EP | 3696922 | A1 | 8/2020 |

OTHER PUBLICATIONS

European Patent Office, International Search Report for International Application No. PCT/EP2022/058996 dated Jul. 15, 2022.

German Patent and Trademark Office, German Search Report for German Patent Application No. DE 10 2021 002 030.8 dated Feb. 1, 2022.

* cited by examiner

ELECTRICAL CONNECTION UNIT HAVING SPRING-LOADED PRESS-ON CONTACTS

CROSS-REFERENCE TO RELATED APPLICATIONS

This application is a continuation of International Application No. PCT/EP2022/058996, published in German, with an international filing date of Apr. 5, 2022, which claims priority to DE 10 2021 002 030.8, filed Apr. 17, 2021, the disclosures of which are incorporated in their entirety by reference herein.

TECHNICAL FIELD

The present invention relates to a connection unit having an insulating mounting frame and multiple resilient press-on contacts situated on the mounting frame, each press-on contact including a helical pressure spring that can exert an elastic force on a metal contact body, and each metal contact body being connected in one piece to a connector plug or a connector socket.

BACKGROUND

This type of connection unit is known from German patent publication DE 10 2008 007 744 B3. Each press-on contact here is formed by a one-piece stamped part having a spiral-shaped spring element.

In addition to solder connections and rigid plug connectors, resilient or elastic (i.e., spring-loaded) press-on contacts are common electrical connection means. Press-on contacts are advantageously usable in particular when electrical modules have to be contacted blindly and/or when tolerances have to be compensated for during connection.

SUMMARY

An object is to provide, in a simple and cost-effective manner, a generic electrical connection unit that includes multiple resilient press-on contacts and that is able to compensate particularly well for tolerances between units to be contacted.

In embodiments of the present invention, a connection unit includes an insulating mounting frame and one or more resilient or elastic (i.e., spring-loaded) press-on contacts (pressure contacts or pressing contacts) situated or arranged on the mounting frame. The mounting frame includes, for each press-on contact, a hollow cylinder which forms a cavity within a peripheral or circumferential wall. Each press-on contact includes a helical or coiled pressure spring and a contact element. The contact element includes a metal contact body that is connected in one piece to a connector plug or a connector socket. The pressure spring can exert an elastic force on the metal contact body (i.e., the pressure spring can load the metal contact body with a spring force). The contact element further includes a cover. The cover closes off the cavity of the hollow cylinder and is arranged so as to be axially displaceable on the peripheral wall of the hollow cylinder. The pressure spring is arranged within the cavity of the hollow cylinder and acts on the cover with its spring force. The metal contact body forms, in one piece, a metal contact disc which is arranged on the outer side of the cover.

Embodiments of the present invention achieve the above object and/or other objects in that each press-on contact includes a pressure spring and a contact element, the contact element includes a contact body and a cover, and, for each press-on contact, the mounting frame includes a hollow cylinder that forms a cavity within a peripheral wall, the cover of the contact element closes off the cavity and is situated so as to be axially displaceable at the peripheral wall of the hollow cylinder, the pressure spring is situated inside the cavity and with its elastic force acts on the cover, and the contact body of the contact element, in one piece, forms a contact disk that is situated on the outer side of the cover.

It may particularly advantageously be provided that the connector plug or socket extends into the cavity and is enclosed or surrounded by the pressure spring, as a result of which a particularly space-saving connection unit may be achieved.

BRIEF DESCRIPTION OF THE DRAWINGS

Advantageous embodiments and refinements of a connection unit in accordance with the present invention are illustrated and explained below with reference to the drawings, which include the following.

DETAILED DESCRIPTION

Figure 1:
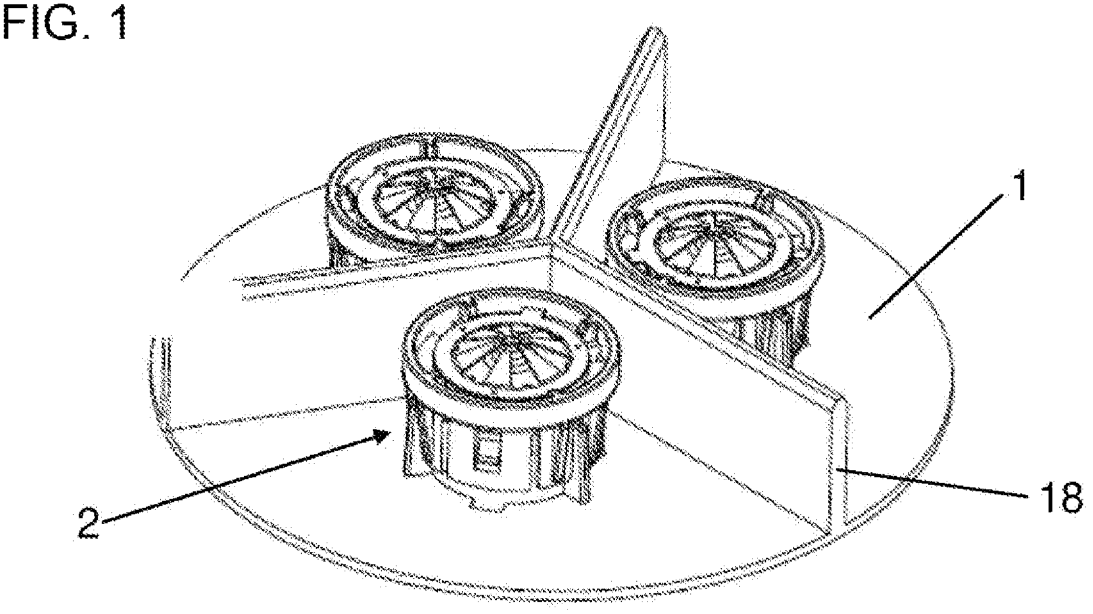
FIG. 1 illustrates a top view of a first embodiment of the connection unit.

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

For all exemplary embodiments illustrated in the figures, identical and functionally equivalent elements are denoted in each case by the same reference numerals, even for an embodiment that differs in part.

Figure 2:
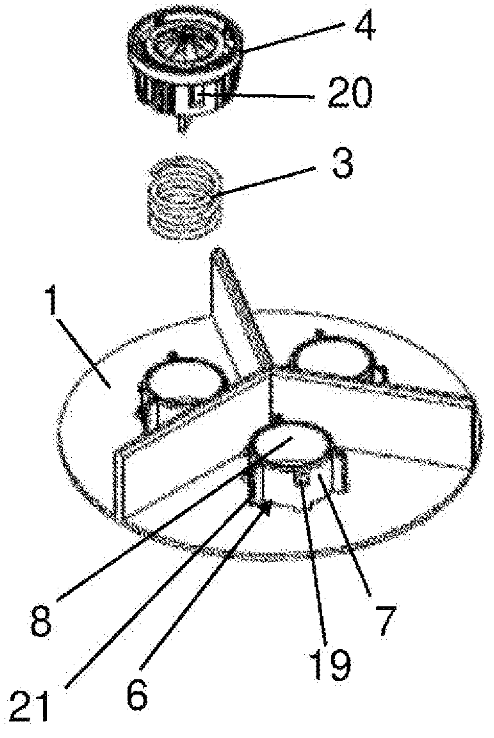
FIG. 2 illustrates an exploded view of the first embodiment of the connection unit.

Referring now to FIGS. 1 and 2, a top view and an exploded view of a connection unit in accordance with a first exemplary embodiment are respectively shown. The connection unit includes a mounting frame 1 having a plurality of press-on contacts 2 mounted thereon. The connection unit includes press-on contacts 2. Strictly by way of example, there are three press-on contacts 2. Situated between press-on contacts 2 are separating webs 18. Longitudinal edges of separating webs 18 are connected in one piece to mounting frame 1, thus mechanically stabilizing the mounting frame.

As shown in FIG. 2, which illustrates the design of a press-on contact 2, each press-on contact 2 includes a pressure spring 3 and a contact element 4. Mounting frame 1, for each press-on contact 2, in one piece forms a hollow cylinder 6 having a peripheral wall 7. Peripheral wall 7 in its interior forms a cavity 8. Pressure spring 3 is inserted into cavity 8 of hollow cylinder 6. Pressure spring 3 is advantageously designed here as a simple helical or coil spring.

Contact element 4 is axially movably connected to hollow cylinder 6. Contact element 4 is pressure-loaded by pressure spring 3 inserted into cavity 8 of hollow cylinder 6.

Figure 3:
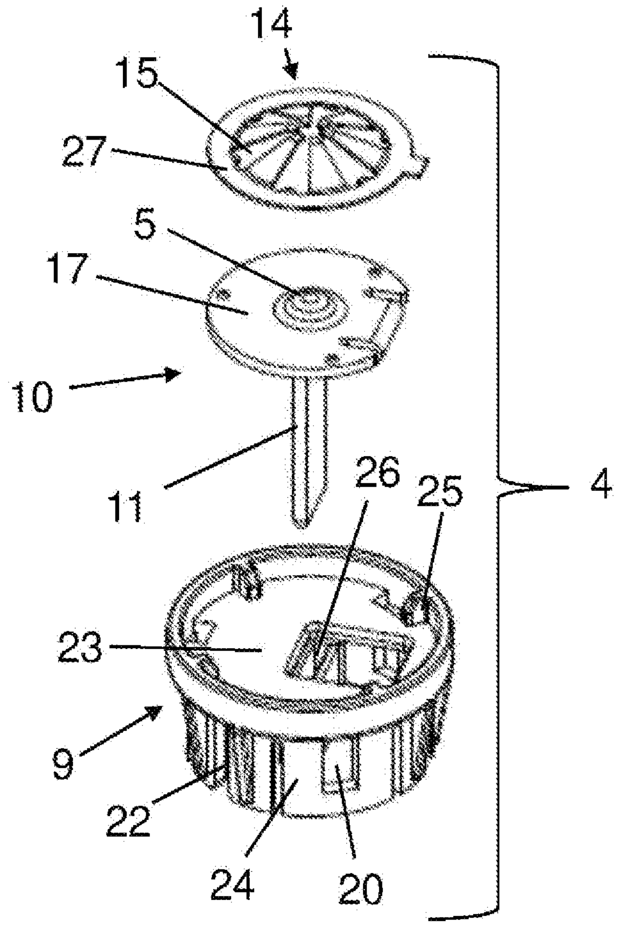
FIG. 3 illustrates an exploded view of a contact element of the first embodiment of the connection unit.

Referring now to FIG. 3, with continual reference to FIGS. 1 and 2, an exploded view of contact element 4 of the first embodiment of the connection unit is shown. The design and construction of contact element 4 is illustrated via the exploded view of FIG. 3. Contact element 4 includes a plastic cover 9, a metal contact body 10, and a resilient, metal lamellar ring 14.

Plastic cover 9 has a circular or round cover surface 23 and flat sections 24 along the circumference of cover surface 23. Flat sections 24 extend perpendicularly with respect to cover surface 23 and are integrally formed in one piece along the circumference of the cover surface. Flat sections 24 in particular form an elongated hole or slot 20 and multiple guide grooves 22.

Figure 4:
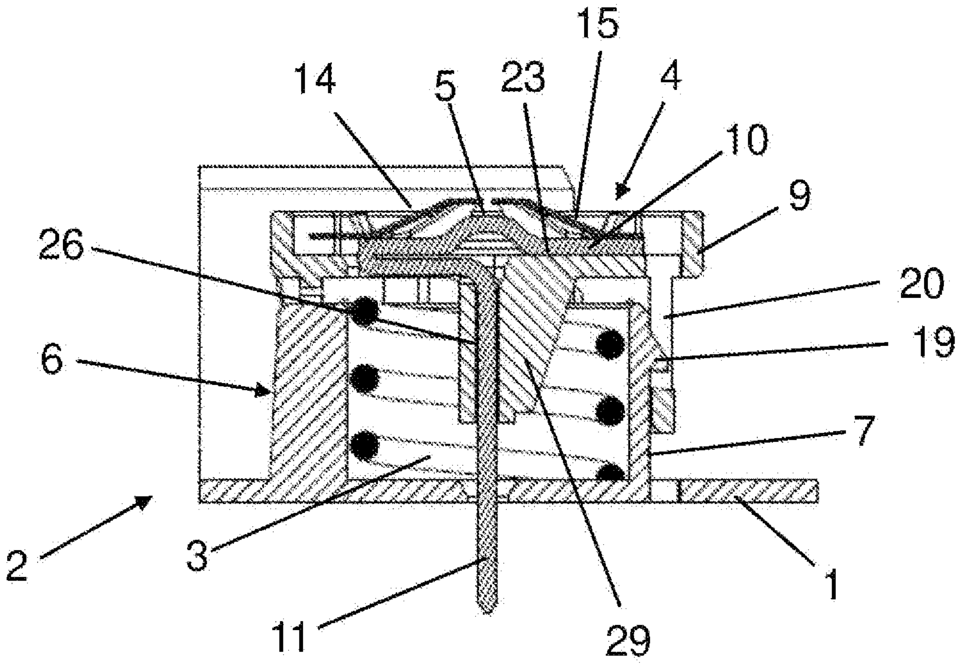
FIG. 4 illustrates a sectional view of a press-on contact of the first embodiment of the connection unit.

Metal contact body 10 includes an approximately circular contact disk 17. Contact body further includes a plug-like or socket-like connector element which is joined thereto in one piece. The connector element is illustrated in FIGS. 3 and 4 as a blade contact 11, by way of example.

Blade contact 11 extends perpendicularly with respect to the surface of contact disk 17 and is guided through a recess 26 in cover 9. As a result, the bottom side of contact disk 17 rests or bears against cover surface 23, at least in sections.

Contact body 10 is fixed to cover 9 by lamellar ring 14. For this purpose, lamellar ring 14 is inserted above contact disk 17 beneath three retaining lugs 25 that are integrally formed on cover 9.

In addition to a ring-shaped or annular section 27, lamellar ring 14 has multiple resiliently or elastically mounted or arranged lamellas 15 that extend radially in one piece from ring-shaped section 27. After installation or assembly above contact body 10, the free end sections of lamellas extend onto or towards a protrusion 5 that is integrally formed centrally on contact disk 17.

For installing or mounting a press-on contact 2, pressure spring 3 of the press-on contact is first inserted into cavity 8 of hollow cylinder 6 formed on mounting frame 1 for the press-on contact and the pre-assembled contact element 4 of the press-on contact is then placed on hollow cylinder 6. Contact element 4 is placed on hollow cylinder 6 with multiple guide webs 21 (FIG. 2) of peripheral wall 7 of hollow cylinder 6 being inserted into guide grooves 22 at cover 9. Guide webs 21 are integrally molded perpendicularly or formed vertically on peripheral wall 7 of hollow cylinder 6.

In addition, detent lug 19 that is integrally formed on peripheral wall 7 of hollow cylinder 6 snaps into elongated hole 20 of cover 9. As a result, contact element 4 is mounted on hollow cylinder 6 so as to be axially movable relative to the hollow cylinder.

FIG. 4 illustrates a sectional view of a completely assembled press-on contact 2 of the first embodiment of the connection unit. It is apparent here that at the bottom side of cover surface 23, cover 9 has a molding 29 in one piece that protrudes into the interior of cavity 8 of hollow cylinder 6. Molding 29 thus creates a relatively long channel-like recess 26 in which blade contact 11 is stably held in a tilt-free manner.

Resilient lamellas 15, which, starting from lamellar ring 14, extend in the direction of protrusion 5 of contact disk 17, improve the electrical contact with a module to be contacted (not shown) and ensure tolerance compensation in the plane of press-on contact 2 when this module is not exactly centrally positioned relative to contact body 10. The axial displaceability of contact element 4, and thus of contact body 10, as a result of pressure spring 3 also provides tolerance compensation in the axial direction.

Figure 5:
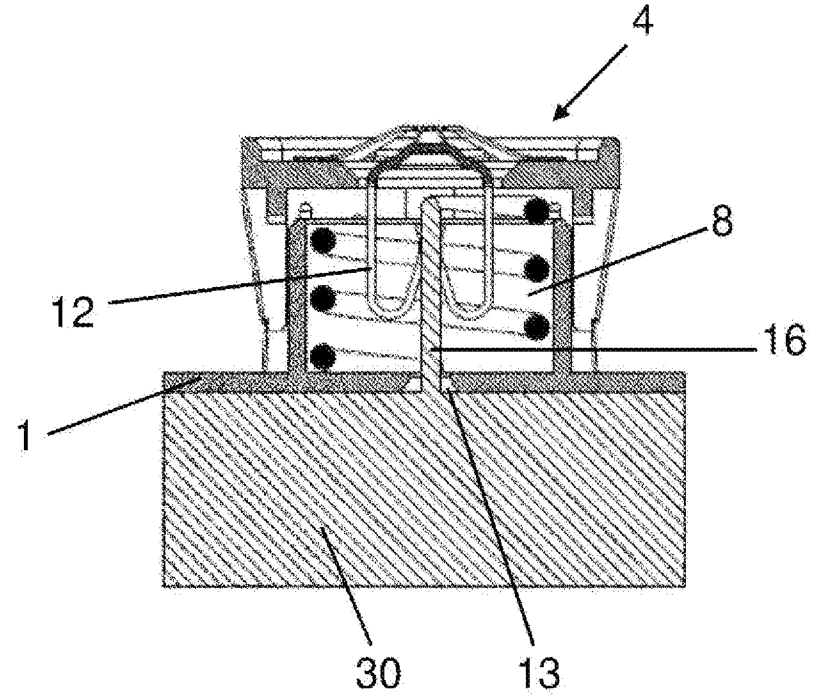
FIG. 5 illustrates a sectional view of a press-on contact of a second embodiment of the connection unit.
Figure 6:
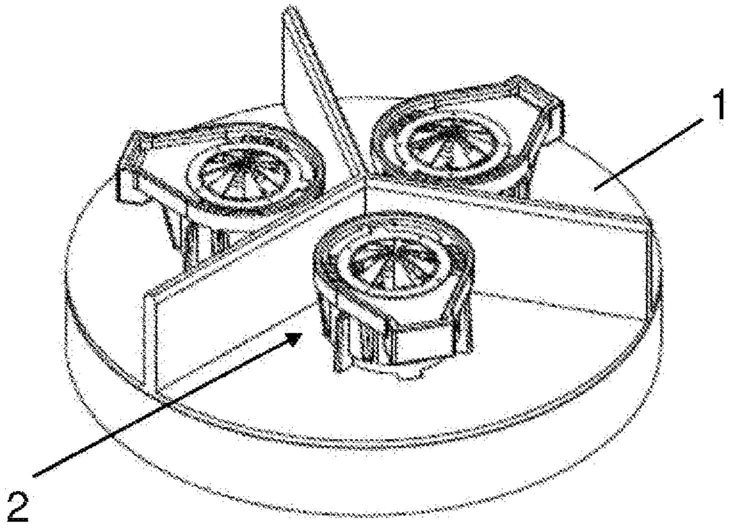
FIG. 6 illustrates a top view of the second embodiment of the connection unit.
Figure 7:
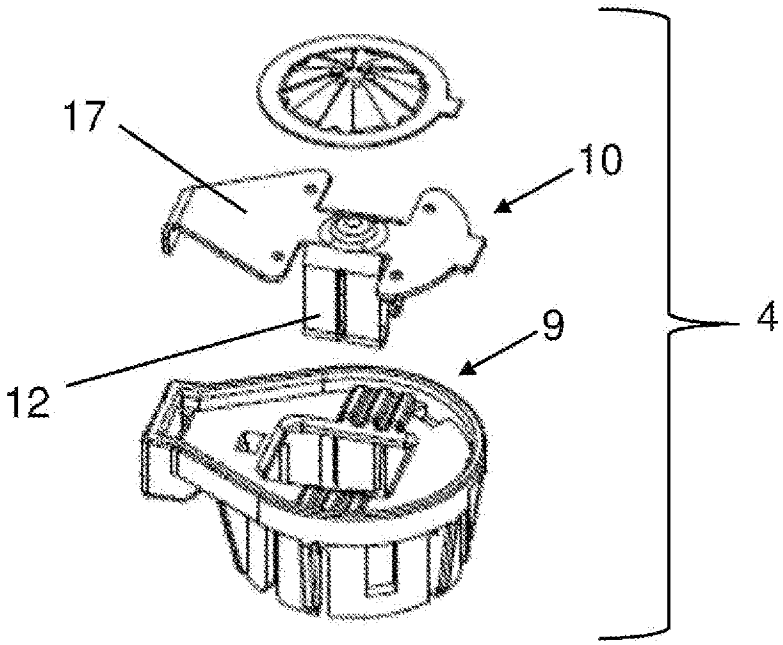
FIG. 7 illustrates an exploded view of a contact element of the second embodiment of the connection unit.

Referring now to FIGS. 5, 6, and 7, a connection unit in accordance with a second exemplary embodiment will now be described. FIG. 5 illustrates a sectional view of a press-on contact 2 of the connection unit; FIG. 6 illustrates a top view of the connection unit; and FIG. 7 illustrates an exploded view of a contact element 4 of the connection unit.

The sectional view in FIG. 5 illustrates that, instead of a connector plug, contact element 4 here has a socket-like connector element in the form of a fork contact 12. Fork contact 12 cooperates with a contact pin 16. Contact pin 16 leads from a connection block 30 situated below mounting frame 1 and is guided through an opening 13 in mounting frame 1 and into the interior of cavity 8 of hollow cylinder 6.

As shown in the exploded view of contact element 4 in FIG. 7, contact disk 17 at contact body 10, instead of a circular shape, has an elongated shape. The elongated shape of contact disk 17 is provided with indentations and is attached in a form-fit manner to the top side of cover 9 having a complementary shape. This allows fork contact 12, which is connected to contact disk 17, to be non-rotatably situated within the circumferential wall of cover 9, without directly fixing fork contact 12 itself to cover 9.

For this second embodiment, FIG. 6 illustrates the completely assembled connection unit with three press-on contacts 2 on mounting frame 1.

Figure 8:
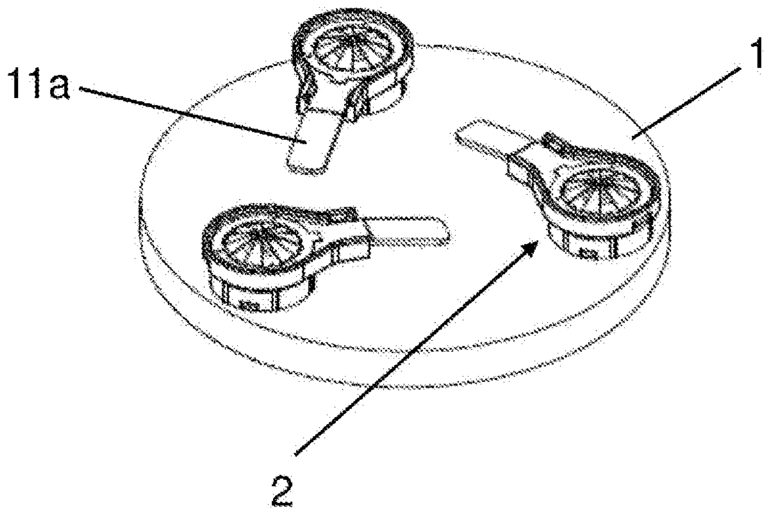
FIG. 8 illustrates a top view of a third embodiment of the connection unit.
Figure 9:
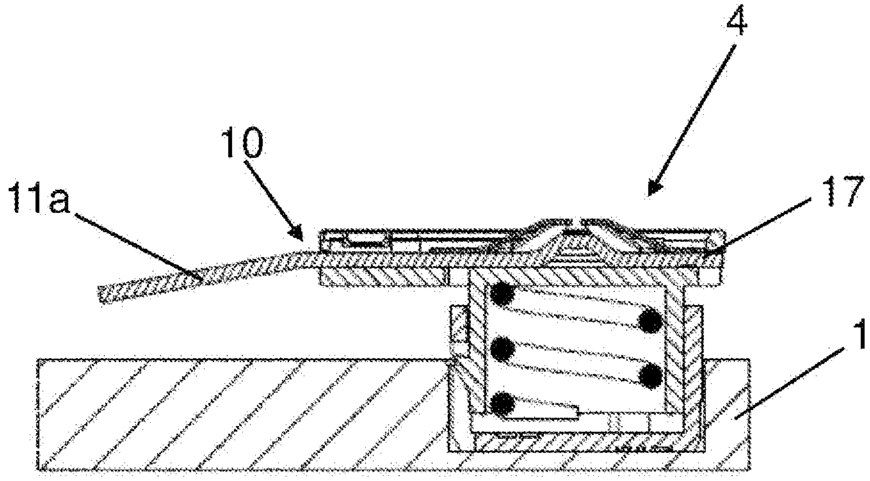
FIG. 9 illustrates a sectional view of a contact element of the third embodiment of the connection unit.

Referring now to FIGS. 8 and 9, a connection unit in accordance with a third exemplary embodiment will now be described. FIG. 8 illustrates a top view of the connection unit; and FIG. 9 illustrates a sectional view of a contact element 4 of the connection unit. As shown in FIGS. 8 and 9, a flat contact 11*a* that laterally protrudes from press-on contacts 2 is provided here in each case as a connector plug. As shown in FIG. 9, flat contact 11*a* is designed in one piece with contact disk 17 of contact body 10.

Flat contact 11*a* may be easily contacted by connection lines having cable lugs (not shown). As the contacting here does not take place inside press-on contacts 2, the structure of mounting frame 1 and of contact element 4 is simplified compared to the previously described embodiments.

In this regard, FIG. 8 illustrates an associated completely assembled connection unit with three press-on contacts 2 on mounting frame 1.

Figure 10:
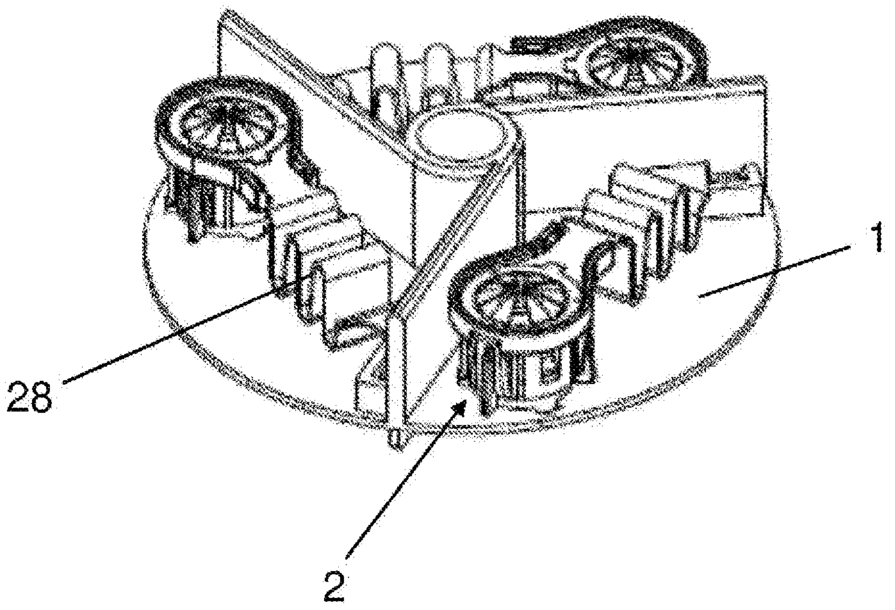
FIG. 10 illustrates a top view of a fourth embodiment of the connection unit.
Figure 11:
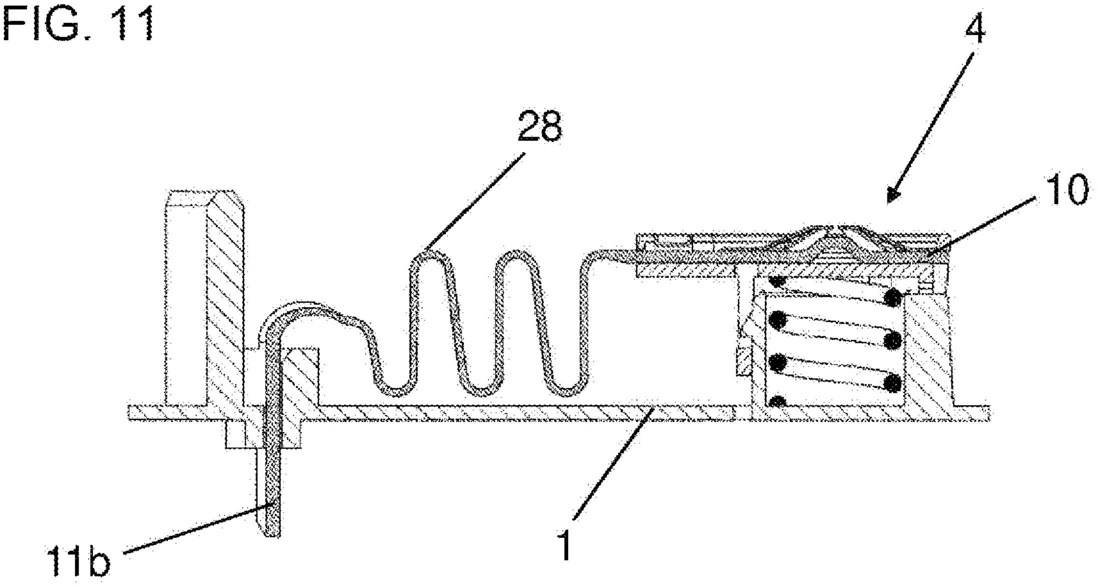
FIG. 11 illustrates a sectional view of a contact element of the fourth embodiment of the connection unit.

Referring now to FIGS. 10 and 11, a connection unit in accordance with a fourth exemplary embodiment will now be described. FIG. 10 illustrates a top view of the connection unit; and FIG. 11 illustrates a sectional view of a contact element 4 of the connection unit.

Once again, flat contacts 11*b* are provided here as connector plugs, which in this case, however, are guided through mounting frame 1, away from press-on contacts 2. For this purpose, flat contacts 11*b* may either be inserted through recesses in mounting frame 1 or molded into mounting frame 1. The connection between flat contacts 11*b* and contact bodies 10 of press-on contacts 2 takes place here in each case via a meander structure 28. Meander structure 28 may preferably be designed in one piece together with flat contact 11*b* and contact body 10. Meander structure 28 forms a multiply folded spring which resiliently compensates for movements of contact element 4 relative to flat contact 11*b* that is fixed to mounting frame 1.

LIST OF REFERENCE NUMERALS

1 mounting frame
2 press-on contact(s) (pressure contact(s), pressing contact(s))
3 pressure spring
4 contact element (resilient)
5 protrusion (bulge)
6 hollow cylinder
7 wall
8 cavity
9 cover (lid)
10 contact body
11, 11*a*, 11*b* connector plug (blade contact, flat contact)
12 connector socket (fork contact)
13 openings
14 lamellar ring
15 lamellas (slats)
16 contact pin
17 contact disk (contact washer)
18 separating webs (dividers)
19 detent lug
20 elongated hole (slot)
21 guide webs
22 guide grooves
23 cover surface
24 flat sections (surface sections)
25 retaining lugs
26 recess
27 ring-shaped section (annular section)
28 meander structure
29 molding
30 connection block (terminal block)

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A connection unit comprising:
an insulating mounting frame including a hollow cylinder that forms a cavity within a wall;
a resilient press-on contact including a pressure spring and a contact element, the contact element including a plastic cover and a metallic contact body, the contact body being connected in one piece to an electrical connector;
the cover closing off the cavity of the hollow cylinder and fitting over and extending around an outer perimeter of the wall of the hollow cylinder so as to be axially displaceable on the wall of the hollow cylinder;
the pressure spring being situated within the cavity of the hollow cylinder, the pressure spring acting on an inner side of the cover with an elastic force and thereby exerting the elastic force on the contact body; and
the contact body in one piece forms a metallic contact disk that is situated on an outer side of the cover.

2. The connection unit of claim 1 wherein:
the contact element further includes a metallic lamellar ring, the lamellar ring being situated on the contact disk.

3. The connection unit of claim 1 wherein:
the electrical connector extends into the cavity of the hollow cylinder and is surrounded by the pressure spring.

4. The connection unit of claim 1 wherein:
the contact body forms the electrical connector, and the electrical connector extends within the cavity of the hollow cylinder through the mounting frame.

5. The connection unit of claim 1 wherein:
the contact body forms the electrical connector, and the electrical connector extends outside of the hollow cylinder through the mounting frame.

6. The connection unit of claim 5 wherein:
the electrical connector is connected to the contact disk via an electrically conductive meander structure situated outside of the hollow cylinder.

7. The connection unit of claim 1 wherein:
the electrical connector is a connector plug that is either a blade contact or a flat contact.

8. The connection unit of claim 7 wherein:
the connector plug that is either a blade contact or a flat contact.

9. The connection unit of claim 1 wherein:
the electrical connector is a connector socket.

10. The connection unit of claim 9 wherein:
the connector socket is a fork contact.

11. A connection unit comprising:
an insulating mounting frame;
a plurality of resilient press-on contacts arranged on the mounting frame, each press-on contact including a pressure spring and a contact element, the contact element including a plastic cover and a metallic contact body, the contact body being connected in one piece to an electrical connector; and
for each press-on contact, the insulating mounting frame including a hollow cylinder that forms a cavity within a wall, the cover of the contact element of the press-on contact closing off the cavity of the hollow cylinder for the press-on contact and fitting over and extending around an outer perimeter of the wall of the hollow cylinder so as to be axially displaceable on the wall of the hollow cylinder, the pressure spring of the press-on contact being situated within the cavity of the hollow cylinder and acting on an inner side of the cover with an elastic force and thereby exerting the elastic force on the contact body, and the contact body of the contact element of the press-on contact in one piece forms a metallic contact disk that is situated on an outer side of the cover.

12. The connection unit of claim 11 wherein:
for each press-on contact, the contact element further includes a metallic lamellar ring, the lamellar ring being situated on the contact disk.

13. The connection unit of claim 11 wherein:
for each press-on contact, the electrical connector extends into the cavity of the hollow cylinder and is surrounded by the pressure spring.

14. The connection unit of claim 11 wherein:
for each press-on contact, the contact body forms the electrical connector, and the electrical connector extends within the cavity of the hollow cylinder through the mounting frame.

15. The connection unit of claim 11 wherein:
for each press-on contact, the contact body forms the electrical connector, and the electrical connector extends outside of the hollow cylinder through the mounting frame.

16. The connection unit of claim 15 wherein:
the electrical connector is connected to the contact disk via an electrically conductive meander structure situated outside of the hollow cylinder.

17. The connection unit of claim 11 wherein:
the electrical connector is either a connector plug or a connector socket.

* * * * *